United States Patent
Ginsberg et al.

(10) Patent No.: US 8,958,521 B2
(45) Date of Patent: *Feb. 17, 2015

(54) METHOD AND APPARATUS FOR AN ALTERNATIVE REMOTE SPENT FUEL POOL COOLING SYSTEM FOR LIGHT WATER REACTORS

(75) Inventors: Robert Joseph Ginsberg, Wilmington, NC (US); Phillip G. Ellison, Wilmington, NC (US); John R. Bass, Wilmington, NC (US); Richard M. Rogers, Wilmington, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 424 days.

This patent is subject to a terminal disclaimer.

(21) Appl. No.: 13/329,910

(22) Filed: Dec. 19, 2011

(65) Prior Publication Data

US 2013/0156144 A1    Jun. 20, 2013

(51) Int. Cl.
*G21C 9/00* (2006.01)

(52) U.S. Cl.
USPC .......................................... 376/298; 376/282

(58) Field of Classification Search
USPC ................................. 376/282, 298
See application file for complete search history.

(56) References Cited

U.S. PATENT DOCUMENTS

| | | | | |
|---|---|---|---|---|
| 3,984,282 | A * | 10/1976 | Kleimola | 376/282 |
| H000627 | H | 4/1989 | Peng | |
| 2012/0051484 | A1* | 3/2012 | Schmidt et al. | 376/273 |
| 2012/0250813 | A1* | 10/2012 | Lloyd et al. | 376/298 |

FOREIGN PATENT DOCUMENTS

| | | |
|---|---|---|
| CA | 2483182 A1 | 10/2003 |
| DE | 3130109 | 2/1983 |
| JP | 57182194 | 11/1982 |
| JP | 58007597 | 1/1983 |
| JP | 58214894 | 12/1983 |
| JP | 61-70496 | 4/1986 |
| JP | 63-63995 | 3/1988 |
| JP | 2004212307 A | 7/2004 |
| JP | 2006322627 A | 11/2006 |
| JP | 2007051929 A | 3/2007 |
| JP | 2011232179 A | 11/2011 |
| JP | 2013057652 A | 3/2013 |
| JP | 2014512002 A | 5/2014 |
| KR | 101229953 B1 | 2/2013 |

OTHER PUBLICATIONS

Aug. 7, 2014 European Search Report issued in corresponding EP Application No. 12195798.
Japanese Office Action for App. No. 2012-271853 mailed on Nov. 25, 2014.

* cited by examiner

*Primary Examiner* — Timothy A Brainard
(74) *Attorney, Agent, or Firm* — Harness, Dickey & Pierce, PLC

(57) ABSTRACT

A method and apparatus for providing an alternative remote spent fuel pool cooling system for the spent fuel pool. The cooling system is operated to cool the spent fuel pool in the event of a plant accident when normal plant electricity is not available for the conventional fuel pool cooling and cleanup system, or when the integrity of the spent fuel has been jeopardized. The cooling system is operated and controlled from a remote location, which is ideal during a plant emergency.

19 Claims, 4 Drawing Sheets

METHOD AND APPARATUS FOR AN ALTERNATIVE REMOTE SPENT FUEL POOL COOLING SYSTEM FOR LIGHT WATER REACTORS

BACKGROUND OF THE INVENTION

1. Field of the Invention

Example embodiments relate generally to nuclear reactors, and more particularly to a method and apparatus for an alternative remote spent fuel pool cooling system for a Light Water Reactor (LWR) nuclear reactor. The cooling system may be particularly beneficial in the event a plant emergency that causes plant electrical power to be disrupted, or normal cooling of the spent fuel pools to otherwise become impaired. The cooling system may also be used to supplement fuel pool cooling via the conventional fuel pool cooling and cleanup system.

2. Related Art

FIG. 1 is a cut-away view of a conventional boiling water nuclear reactor (BWR) reactor building 5, which is one example of a light water reactor (LWR). It should be understood that this is merely an example, as other reactor design layouts may be used for other LWRs. The spent fuel pools 10 are storage pools used to store spent fuel 12 that remain following the use of the fuel to power the BWR reactor 1. The spent fuel pools 10 are generally positioned in locations adjacent to, and toward the top of, the reactor 1 (as shown in FIG. 1, the spent fuel pool 10 is located in secondary containment, outside of the steel containment vessel 3 and concrete shell 4 protecting reactor 1). The spent fuel pool may be located at a plant elevation that is above a location of the suppression pool 2. It should be noted that in other reactor designs, the spent fuel pool may be located at a same plant elevation as the reactor, or at an elevation that is below the reactor. The spent fuel 12 is generally stored in the spent fuel pools 10 for a period of at least 5 years before being sent to reprocessing or cask storage. The spent fuel pools 10 are typically 40 feet or greater in depth, with the bottom 14 feet being equipped with storage racks that hold the fuel assemblies that are removed from the reactor. About 8 feet of water (above the top of the spent fuel, itself) is generally needed to keep radiation levels in the spent fuel pools 10 within acceptable limits (see spent fuel pool water level 10b, which is above the spent fuel 12).

A flow of cooling water, provided by conventional fuel pool cooling and cleanup system (not shown), provides shielding from radiation and maintains the spent fuel pools 10 at cool temperatures that ensure the cooling water does not boil (thereby exposing the spent fuel to open air). The conventional spent fuel cooling pumps provide cooling of the spent fuel pools. Specifically, the conventional fuel pool cooling pumps transfer the water from the spent fuel pool to the fuel pool cooling and cleanup system. The conventional fuel pool cooling and cleanup system cools and cleans the water, using a heat exchanger and demineralizers (removing some radioisotopes, and other impurities). The fuel pool cooling pumps then send the cool, clean water back to the spent fuel pool 10.

During a serious plant accident, normal plant electrical power may be disrupted. In particular, the plant may be without normal electrical power to run the conventional fuel pool cooling pumps, or operate the fuel pool cooling and cleanup system. If electrical power is disrupted for a lengthy period of time, disruption in the use of the fuel pool cooling and cleanup system may cause water in the spent fuel pool to warm and eventually boil. When enough boiling occurs, water levels in the pool may drop to levels that no longer provide enough cooling water to effectively shield radiation that may be caused by the spent fuel. In very serious emergencies, water in the spent fuel pool may boil and evaporate to the point that the spent fuel may become exposed to open air. Such an emergency may pose grave dangers for plant personnel and the environment.

In a plant emergency, even if the spent fuel in the spent fuel pool is not exposed to open air (in the event of a worst-case accident scenario), there are still concerns with radiation leakage leaving the spent fuel pool and escaping to the environment. In particular, the fuel pool cooling and cleanup system may become over-loaded in handling the cooling and radiation reduction needs of the spent fuel pool. This may particularly be the case, in the event that fuel damage occurs in the spent fuel pool. If the integrity of the fuel rods within the spent fuel pool becomes jeopardized, use of the fuel pool cooling and cleanup system may pose risks to plant personnel and the environment, as highly radioactive water (above acceptable design limits) may be transferred to the fuel pool cooling and cleanup system. In such a scenario, the fuel pool cooling and cleanup system may be unable to assist in effectively reducing radiation levels of the spent fuel pool water. Therefore, the transfer of the highly radioactive water to the fuel pool cooling and cleanup system may, in and of itself, cause a potential escalation in the abilities to contain harmful radioactive isotopes within secondary containment.

SUMMARY OF INVENTION

Example embodiments provide a method and an apparatus for providing an alternative remote spent fuel pool cooling system for the spent fuel pool. The cooling system may be a single-stage, once-through heat exchanger that does not pose a hazard to the environment. The cooling system could be operated to cool the spent fuel pool even in the event of a plant accident where normal plant electricity is not available to run the conventional spent fuel pool cooling and cleanup system or the fuel pool cooling pumps. Additionally, the cooling system may be particularly beneficial in instances when fuel damage has occurred and the conventional spent fuel pool cooling and cleanup system become ineffective in containing radiation leakage to other areas of the plant. The cooling system could be operated and controlled from a remote location, which is ideal during a plant emergency.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
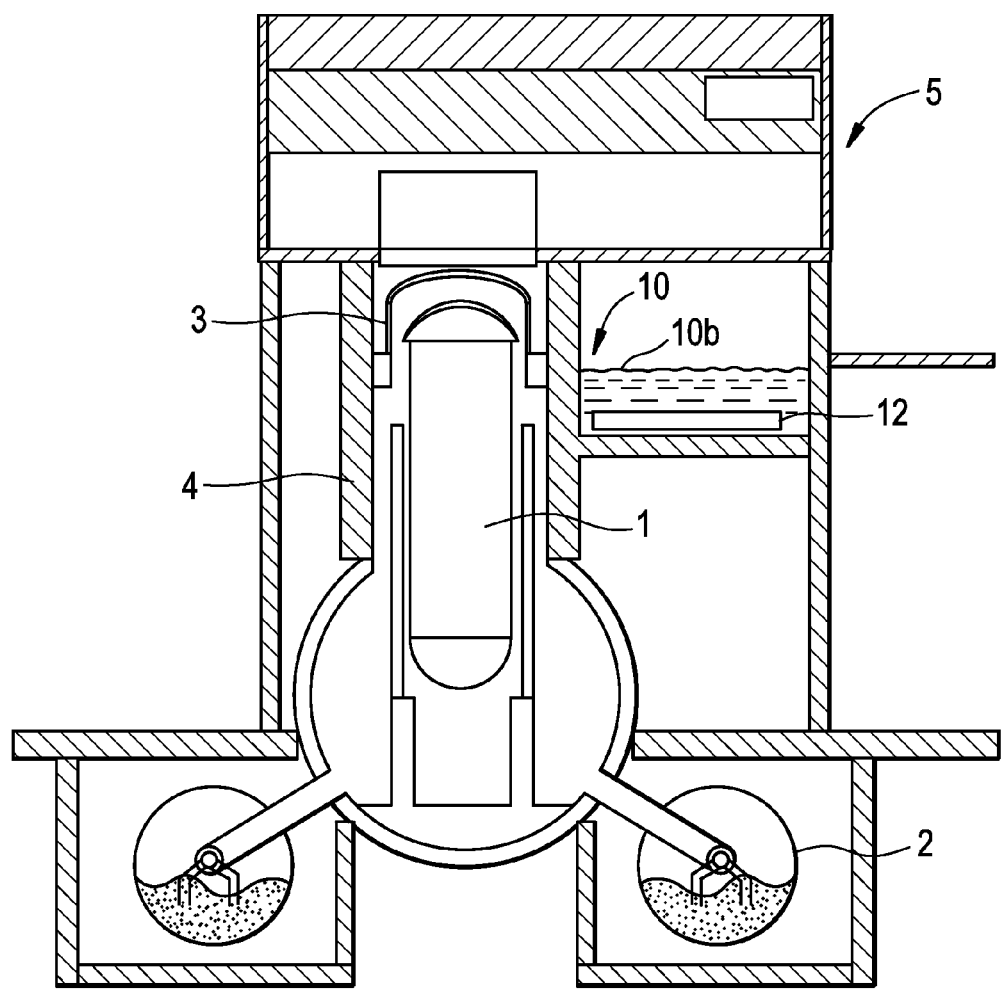
FIG. 1 is a cut-away view of one example design of a conventional light water nuclear reactor (LWR) reactor building.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
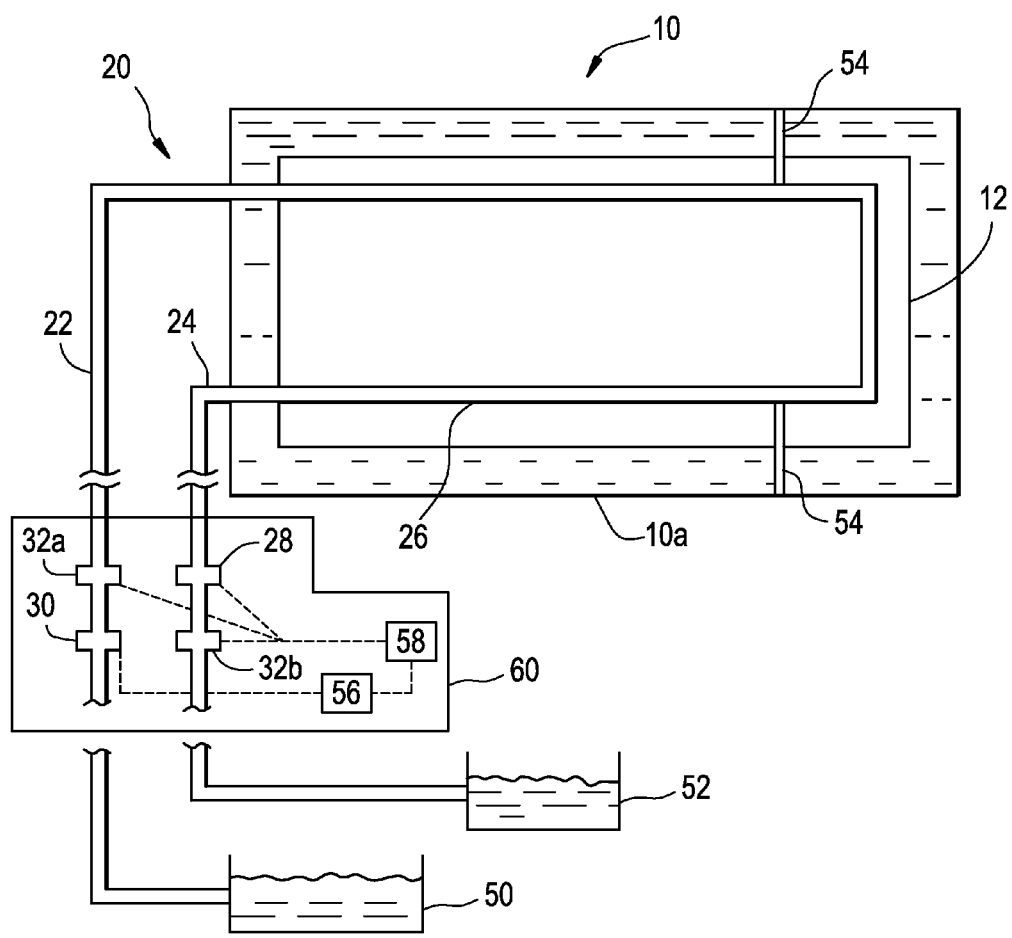
FIG. 2 is an overhead view of a spent fuel pool, in accordance with an example embodiment.

FIG. 2 is an overhead view of a spent fuel pool 10, in accordance with an example embodiment. The cooling system 20 may provide an in situ heat exchanger (within the spent fuel pool 10), to cool the pool 10 without the need for removing water from the spent fuel pool 10. The cooling system 20 may include a cooling pipe 26 that provides a flow of cooling water through the pipe 26. The cooling pipe 26 may be positioned within the spent fuel pool 10, and around the area of the spent fuel 12 within the pool 10. The cooling pipe 26 may include a single cold water inlet 22 and a single warm water outlet 24, to provide a single-stage, once-through heat exchanger within the spent fuel pool 10. Benefits of a single-stage, once-through cooling system 20 include an increased efficiency, as the greatest amount of heat may be exchanged per gallon of water flowing through the cooling pipe 26. Alternatively to a single-stage, once-through cooling system 20 (as shown in FIG. 2), a multi-stage cooling system 20 (not shown) may be used. The multi-stage cooling system 20 may include multiple single-stage passes of cooling pipe 26 that may each be the same as the single-stage cooling system 20 shown in FIG. 2.

To help mitigate the chance of radiation leakage from the spent fuel pool 10 into the cooling pipe 26, the pressure of cooling water flowing through the cooling pipe 26 may be maintained above the pressure of the water in the spent fuel pool 10. Because the spent fuel pool is exposed to open air within the plant, the atmospheric pressure above the spent fuel pool 10 is approximately 1 atmosphere of pressure. Therefore, to mitigate radiation leakage, the pressure of the fluid flowing through the cooling pipe 26 may be maintained at a pressure of 1 atmosphere or greater, plus the static pressure of the water at the lowest depth upon which the cooling pipe 26 extends. To be conservative, the pressure of the cooling pipe 26 may be maintained at a pressure of 1 atmosphere, plus the static pressure of the water at the deepest depth of the spent fuel pool 10.

In addition to maintaining the pressure of the cooling pipe 26 above the pressure of the water in the spent fuel pool 10 (to mitigate the chance of radiation leakage), a radiation monitor 28 may also be located on the warm water outlet 24 piping. The radiation monitor 28 may measure radiation levels of cooling water flowing out of the spent fuel pool 10, to ensure that radiation leakage out of the pool 10 does not occur.

To pump cooling water through the cooling pipe 26, a dedicated cooling system pump 30 may be used. The pump 30 may run on a back-up diesel generator 56 or directly driven by a diesel engine 56, to ensure that the pump 30 is not reliant on normal plant electrical power that may be unavailable in the event of a serious plant emergency. The size of the pump 30 may vary, depending on the size of the spent fuel pool 10. The size of the pump 30 may also vary based on design calculations for worst-case heat output of the spent fuel pool 10 during an accident scenario. In order to mitigate a plant accident for most LWR designs, the pump 30 may provide a cooling water flow-rate of about 300 gallons/minute. It should be understood that a greater cooling water flow-rate will cause increased heat exchange, at the expense of a reduced efficiency of the cooling system 20.

It should be noted that conventional emergency portable pumps (not shown), which are generally available in a LWR nuclear plant, may be used as the cooling system pump 30. If a single-stage, once-through cooling pipe 26 is used, a single pump 30 may be adequate. If a multi-stage cooling pipe 26 is used, a single pump 30 for each stage of the cooling pipe 26 may be used (i.e., the multi-stage configuration may include multiple cooling systems 20, similar to the one shown in FIG. 2).

Alternative to using a cooling system pump 30, gravity draining of cooling water through the cooling pipe 26 may be implemented. Gravity draining of cooling water through the cooling pipe 26 offers an additional level of safety for the cooling system 20, as no pumping power would be required to use the system. However, such a configuration would require a cooling water source 50 to be located at an elevation above the liquid level 10b (see FIGS. 1 and 3) of the spent fuel pool 10. A cooling water source 50 may be an ocean, a river, a large outdoor body of water, or a man-made structure containing a source of water. The warm water outlet 24 would then need to be discharged to a water discharge 52 location with an elevation that is below the lowest elevation of the cooling water pipe 26 that runs through the spent fuel pool 10. The water discharge 52 may also be an outdoor body of water, or a man-made structure used to collect the discharged water.

Whether gravity draining or a cooling system pump 30 is used for the cooling system 20, all controls (see controller 58) associated with the system 20 may be positioned in a remote location 60 that is remote to the spent fuel pool 10, for the safety of plant personnel. That is to say, locations of the pumps 30, or locations of controller 58 used to operate the pump 30, inlet/outlet valves 32a/32b (if the valves are not manually operated), and radiation monitor 28, may be located a distance from the pool 10. Similarly, inlet valves 32a (on the cold water inlet 22) and/or outlet valves 32b (on the warm water outlet 24), used to control the flow of water through the cooling pipe 26, may be positioned in locations remote from the pool 10 (especially in the event that valves 32a/32b are manually operated). This is to ensure that plant personnel may safely operate the system 20 without being exposed to potentially high levels of radiation that may be present in the spent fuel pool 10 during an accident condition.

The configuration of the cooling pipe 26 may include a single loop around the spent fuel pool 10, as shown in FIG. 2. Alternatively, the cooling pipe 26 may entail other configurations, which may include additional loops or a "snake"-shaped configuration (not shown) through the pool. The cooling pipe 26 may be finned, or otherwise configured to maximize the surface area of the pipe 26 to increase the heat exchange capacity between the pipe 26 and the water in the spent fuel pool 10. Additionally, the cooling system pipe 26 may include branching 26a/26b/26c (see FIG. 3) of the cooling water pipe, which may also increase the heat that is exchanged between the cooling pipes 26 and the water in the spent fuel pool 10. Branched cooling system pipe 26 may still have a single cold water inlet 22 and a single warm water outlet 24, to reduce the amount of cooling piping 26 being exposed to areas of the plant other than the spent fuel pool 10. The single cold water inlet 22 and single warm water outlet 24 configuration may further reduce the possibility of radiation leakage to other areas of the plant.

Figure 3:
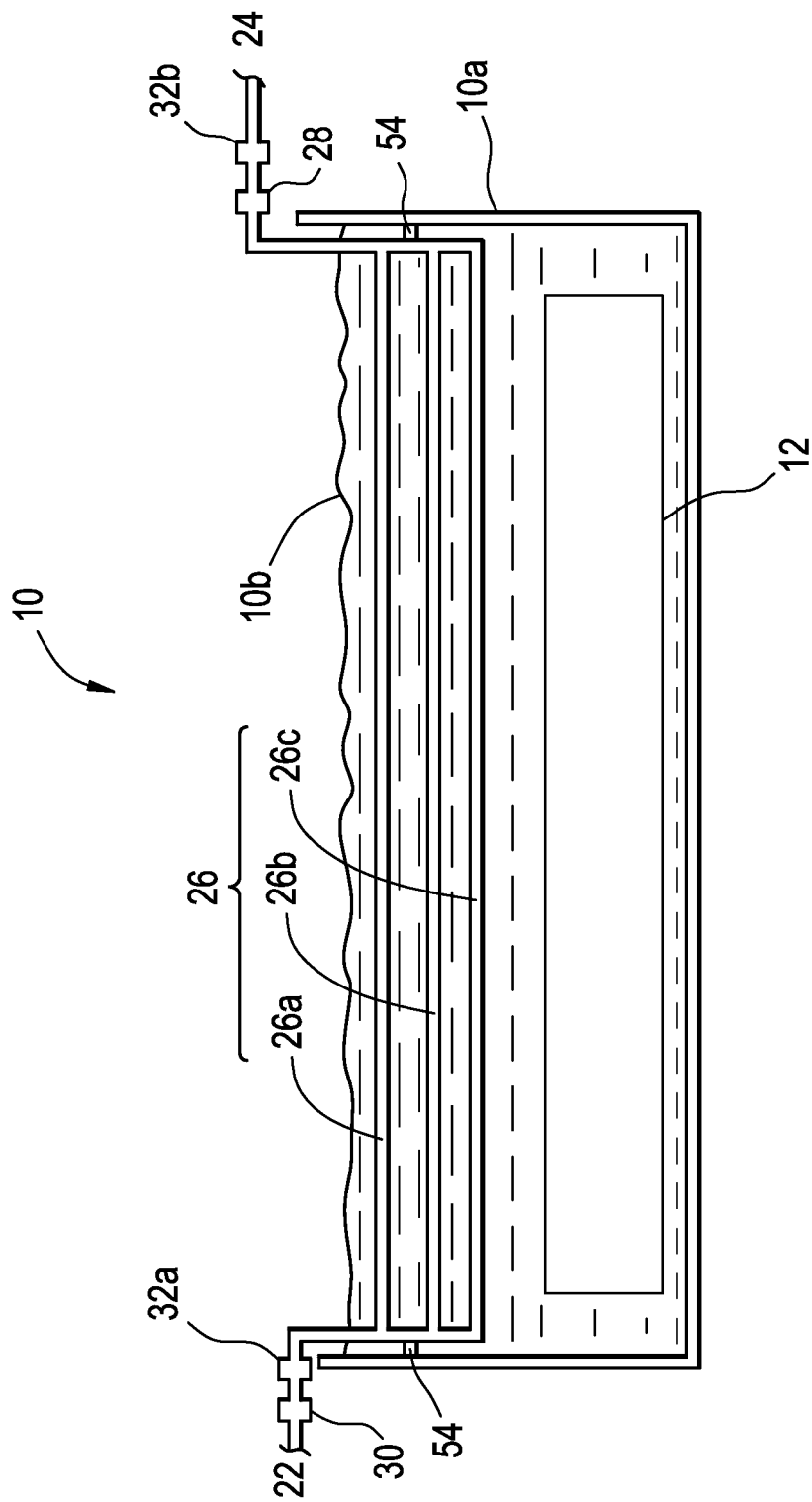
FIG. 3 is a side-view of a spent fuel pool, in accordance with an example embodiment.

FIG. 3 is a side-view of a spent fuel pool 10, in accordance with an example embodiment. Conventionally, the spent fuel 12 is located at a depth of about ⅓ the overall depth of the spent fuel pool 10. Therefore, the cooling pipe 26 (including branches 26a/26b/26c) may be located in a position that is generally above the spent fuel 12 and below the water level 10b of the pool 10. By locating the cooling pipe 26 above the spent fuel 12, the cooling pipe 26 will create a natural convection current to form. Specifically, the cooling pipe 26 will produce cool water above the locations of the spent fuel 12, and this cooler water will naturally settle to the bottom of the pool 10. Likewise, the spent fuel 12 will produce warmer water near the bottom of the spent fuel pool 10, and this warmer water will naturally rise within the pool 10. Therefore, by locating the cooling pipe 26 above the locations of the spent fuel 12, the heat exchanging process of the cooling system will be more efficient.

The cooling pipes 26 may be anchored to the pool walls 10a of the spent fuel pool 10 using anchors 54 (see FIGS. 2 and 3), for extra support. The cooling pipes 26 may be installed prior to LWR plant operation, to ensure that the cooling system 20 is in place prior to a potential plant accident. Alternatively, the cooling system 20 may be installed as a retro-fitted system. The cooling pipes 26 may be permanently installed in the spent fuel pool 10, in which case the cooling pipes 26 may be located in positions within the pool 10 that do not interfere with the installment and removal of spent fuel 12 within the pool. Alternatively, the cooling pipes 26 may be temporarily held in place within the pool 10 via brackets, in which case the cooling pipes 26 may be located directly above locations of the spent fuel 12.

It should be understood that cooling system 20 may be used during periods of time other than plant accident conditions. For instance, the cooling system 20 may be used simply to supplement the normal cooling of the spent fuel pool via the conventional fuel pool cooling and cleanup system. It should also be understood that the temperature of the cooling water supply for the cooling system 20 will impact system performance. That is to say, the cooling system 20 will be more effective and efficient if colder cooling water supply is used.

Figure 4:
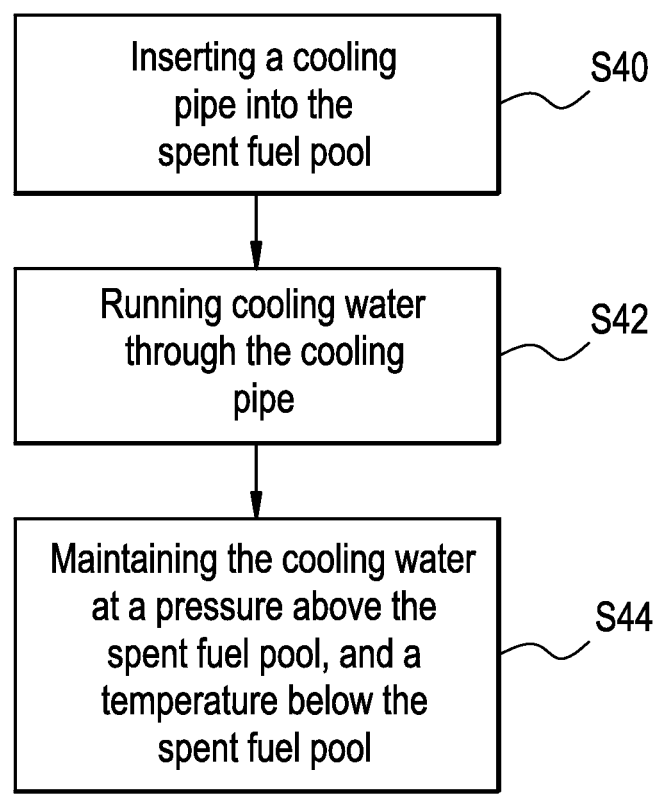
FIG. 4 is a flowchart of a method of cooling the spent fuel pool, in accordance with an example embodiment.

FIG. 4 is a flowchart of a method of cooling the spent fuel pool, in accordance with an example embodiment. As shown in method step S40, a cooling pipe 26 may be inserted into the spent fuel pool 10. As shown in step S42, cooling water from a cooling water source may be run through the cooling pipe 26. As shown in step S44, the cooling water in the cooling pipe 26 may be maintained at a pressure that is above the pressure of the water in the spent fuel pool 10. The cooling water in the cooling pipe may also be maintained at a temperature that is below the temperature of the water in the spent fuel pool 10.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of alternatively cooling a spent fuel pool of a Light Water Reactor (LWR), comprising:
    removing heat from the spent fuel pool by running cooling water through a cooling pipe, the cooling water having a cooler temperature than water in the spent fuel pool,
    attaching a single inlet pipe and a single outlet pipe to the cooling pipe, the inlet and outlet pipe extending beyond the confines of the spent fuel pool,
    fluidly connecting the inlet pipe to a water source located at an elevation above a liquid level of the spent fuel pool, and
    fluidly connecting the outlet pipe to a water discharge location located at an elevation below the spent fuel pool,
    the running of the cooling water through the cooling pipe occurring via gravity draining.

2. The method of claim 1, further comprising:
    maintaining a pressure of the cooling water in the cooling pipe above the pressure of the spent fuel pool water.

3. The method of claim 1, further comprising:
    producing a natural convection within the spent fuel pool, by positioning portions of the cooling pipe above locations of spent fuel within the spent fuel pool and below a liquid level of the spent fuel pool.

4. The method of claim 1, further comprising:
    connecting a pump to the inlet pipe, and
    connecting a back-up diesel engine to the pump.

5. The method of claim 4, further comprising:
    positioning the pump, and all controls for the pump, in a location that is remote from the spent fuel pool.

6. The method of claim 1, further comprising:
    providing branching and fins on portions of cooling pipe.

7. The method of claim 1, further comprising:
    anchoring portions of the cooling pipe to a wall of the spent fuel pool.

8. The method of claim 1, further comprising:
inserting a second cooling pipe into the spent fuel pool, and
removing more heat from the spent fuel pool by running cooling water through the second cooling pipe, the cooling water having a cooler temperature than the spent fuel pool water.

9. The method of claim 1, wherein the water source and the water discharge are both located outside of a primary containment and a secondary containment boundary of the LWR.

10. A system of cooling a spent fuel pool of a Light Water Reactor (LWR), comprising:
a cooling pipe, with portions of the cooling pipe being positioned below an expected liquid level of the spent fuel pool,
the cooling pipe configured to provide a flow of cooling water through the cooling pipe that is a higher pressure and cooler temperature than the spent fuel pool water,
a single inlet pipe attached to the cooling pipe,
a single outlet pipe attached to the cooling pipe,
the inlet and outlet pipe extending beyond the confines of the spent fuel pool a water source fluidly coupled to the inlet pipe, the water source being located at an elevation above the expected liquid level of the spent fuel pool, and
a water discharge point located at an elevation below the spent fuel pool.

11. The system of claim 10, wherein portions of the cooling pipe are positioned above locations of spent fuel within the spent fuel pool.

12. The system of claim 10, further comprising:
a pump connected to the inlet pipe, and
a back-up diesel engine connected to the pump.

13. The system of claim 12, further comprising:
controls electrically connected to the pump,
wherein the pump, and the controls for the pump, are positioned in a location that is remote from the spent fuel pool.

14. The system of claim 10, wherein the cooling pipe includes branches and fins.

15. The system of claim 10, further comprising:
one or more anchors connected to a wall of the spent fuel pool, to support the cooling pipe.

16. The system of claim 10, further comprising:
a second cooling pipe, with portions of the second cooling pipe being positioned below the liquid level of the spent fuel pool,
the second cooling pipe configured to provide a flow of cooling water through the cooling pipe that is a higher pressure and cooler temperature than the spent fuel pool water.

17. The system of claim 10, wherein the water source and the water discharge are both located outside of a primary containment and a secondary containment boundary of the LWR.

18. A system of cooling a spent fuel pool of a Light Water Reactor (LWR), comprising:
the spent fuel pool located in a reactor building,
a suppression pool located in the reactor building,
a cooling pipe, with portions of the cooling pipe being positioned below an expected liquid level of the spent fuel pool,
the cooling pipe configured to provide a flow of cooling water through the cooling pipe that is a higher pressure and cooler temperature than the spent fuel pool water,
a single inlet pipe attached to the cooling pipe,
a single outlet pipe attached to the cooling pipe,
the inlet and outlet pipe extending beyond the confines of the spent fuel pool
a water source fluidly coupled to the inlet pipe, the water source being located at an elevation above the expected liquid level of the spent fuel pool, and a water discharge point located at an elevation below the spent fuel pool.

19. The system of claim 18, wherein the water source and the water discharge are both located outside of a primary containment and a secondary containment boundary of the LWR.

\* \* \* \* \*